United States Patent [19]

Miyamoto et al.

[11] Patent Number: 4,541,958

[45] Date of Patent: Sep. 17, 1985

[54] HARDENING AGENT FOR EPOXY RESINS COMPRISING AN AMIDEAMINE COMPOUND

[75] Inventors: Akira Miyamoto; Katsuo Sato; Tetsushi Ichikawa; Masahiro Kurokawa, all of Kanagawa, Japan

[73] Assignee: Mitsubishi Gas Chemical Company, Inc., Tokyo, Japan

[21] Appl. No.: 497,283

[22] Filed: May 23, 1983

[30] Foreign Application Priority Data

May 21, 1982 [JP] Japan .................... 57-86150

[51] Int. Cl.⁴ ........................... C09F 5/00; C09F 7/00
[52] U.S. Cl. ................... 260/404.5; 260/413; 564/220; 564/221
[58] Field of Search .............. 260/404.5 R, 413 Q, 260/413; 562/448; 564/157, 159, 185, 220, 221

[56] References Cited

U.S. PATENT DOCUMENTS 3,816,366  6/1974  Laudise ............... 260/404.5 R X
3,946,053  3/1976  Robinson et al. ......... 260/404.5 R
4,034,040  7/1977  Cronin ................ 260/404.5 R X
4,144,255  3/1979  Richardson ............ 260/404.5 R Primary Examiner—Helen M. S. Sneed
Attorney, Agent, or Firm—Sughrue, Mion, Zinn, Macpeak, and Seas

[57] ABSTRACT

A hardening agent for epoxy resins comprising an amideamine compound which is a reaction product between (A) a polyamine mainly comprising a compound represented by the formula:

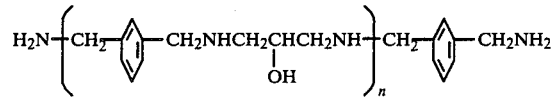

wherein n represents 1 or 2, which is obtained by reacting m-xylylenediamine and epichlorohydrin, and (B) a carboxylic acid.

4 Claims, No Drawings

HARDENING AGENT FOR EPOXY RESINS COMPRISING AN AMIDEAMINE COMPOUND

FIELD OF THE INVENTION

This invention relates to a hardening agent for epoxy resins.

BACKGROUND OF THE INVENTION

Mono- or polyamide compounds containing an amino group having active hydrogen have hitherto been used as hardening agents for epoxy resins. Most of these compounds are obtained by reacting at least one carboxylic acid selected from polymerized fatty acids and carboxylic acids with a polyalkylenepolyamine, and are called polyamide-type hardening agents or polyamideamine-type hardening agents. These hardening agents have many advantages, for example, they can be used at various proportions to epoxy resins, as well as they have long pot-life, low toxicity as compared with amine type hardening agents, excellent flexibility and adhesiveness of the hardened product obtained from these hardening agents and epoxy resins, and so on. On the other hand, these hardening agents are disadvantageous in that they show poor compatibility with epoxy resins and that the hardened products, when hardened at ambient temperature, have insufficient transparency, strength and chemical-resistance, etc. Further, in some cases, an aging time would be required for obtaining good hardened epoxy resin products, thus giving rise to a problem of reduction in working efficiency.

SUMMARY OF THE INVENTION

The present inventors have conducted intensive investigations to eliminate the above-described disadvantages and, as a result, found that a monoamideamine compound or polyamideamine compound obtained by reacting a polyamine compound which is a reaction product between m-xylylenediamine and epichlorohydrin, alone or as a main component of polyamines, with a carboxylic acid (said mono- or polyamideamine compounds being hereinafter referred to "amideamine compound") exhibits excellent properties as a hardening agent for epoxy resins, and completed the present invention.

The above-described polyamine compound represented by the formula (I) below wherein n is 1 is disclosed in U.S. patent application Ser. No. 473,404 filed Mar. 8, 1983.

This invention relates to a hardening agent for epoxy resins comprising an amideamine compound that is a reaction product between (A) a polyamine consisting mainly of a compound represented by the formula:

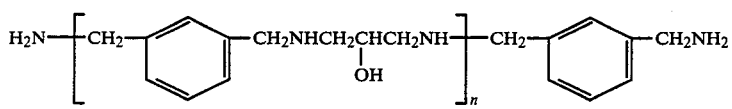

wherein n is a number of repeating units and represents an integer of 1 or 2, and (B) a carboxylic acid.

DETAILED DESCRIPTION OF THE INVENTION

Polyamines (A) that can be used as starting materials for the amideamine compounds of the present invention consist mainly of a polyamine compound represented by the above formula (I) which is obtained by reacting m-xylylenediamine with epichlorohydrin. The polyamine compound of the formula (I) may be used alone or in combination with other amines such as aliphatic polyamines, e.g., ethylenediamine, diethylenetriamine, triethylenetetramine, hexamethylenediamine, etc.; aromatic diamines, e.g., phenylenediamine, diaminodiphenylmethane, diaminodiphenylsulfone, etc.; aliphatic amines having an aromatic ring, e.g., xylylenediamines, etc.; and alicyclic amines, e.g., isophoronediamine, menthanediamine, bis(aminomethyl)cyclohexane, etc. In particular, m-xylylenediamine is preferred. These amines can be used at a proportion of 50% by weight or less with respect to the polyamine of the formula (I) above.

The polyamine compound represented by the above-described formula (I) which is a reaction product between m-xylylenediamine and epichlorohydrin can have variable n values in the formula (I) by varying the molar ratio of m-xylylenediamine to epichlorohydrin. For example, when the n value is 2, m-xylylenediamine can be used in an amount of about 2 to about 10 mols, preferably 4 to 8 mols, per mol of epichlorohydrin. If n exceeds 2, though hardening characteristic and the like after polyamide formation are not so greatly influenced, the viscosity of the resulting polyamine compound per se becomes high, resulting in poor workability. Therefore, n is preferably 2 or less, which means 2 or less in average, i.e., the polyamine compounds represented by the formula (I) may include those compounds wherein n is 2 or more.

Carboxylic acids (B) that can be used in the present invention include, for example, polycarboxylic acids, such as polymerized fatty acids, dicarboxylic acids represented by the formula HOOC—R—COOH wherein R is a divalent aliphatic radical represented by $-(CH_2)_m-$ wherein m is 0 or an integer of 1 to 18 or a phenylene radical, and monocarboxylic acids. The polymerized fatty acids used herein are known polybasic acids obtained by polymerizing an unsaturated fatty acid such as oleic acid and linolic acid and an unsaturated vegetable oil acid and are commercially available as dimer acids under various trade names. Typical examples of these polymerized fatty acids are mixtures containing 1 to 15 wt% of a $C_{18}$ monocarboxylic acid, 75 to 96 wt% of a $C_{36}$ dimer acid and 3 to 21 wt% of a $C_{54}$ trimer acid. Dicarboxylic acids represented by the formula HOOC—R—COOH wherein R is as defined above include, for example, adipic acid, azelaic acid, sebacic acid, isophthalic acid, terephthalic acid and the like. Monocarboxylic acids include saturated fatty acids, e.g., acetic acid, butyric acid, stearic acid, etc.; unsaturated fatty acids, e.g., oleic acid, linolic acid, linoleic acid, etc.; and fatty acids mainly comprising unsaturated fatty acids which are obtained from natural fats and oils such as tall oil fatty acid and soybean oil fatty acid. Of these, fatty acids mainly comprising unsaturated fatty acids obtained from natural fats and oils are preferred, with tall oil fatty acid being particularly preferred.

In preparing the amideamine compounds of the present invention, the proportion of polyamines (A) and carboxylic acids (B) used in the reaction is not particularly limited as long as gelation can be avoided and monoamideamine compounds or polyamideamine compounds containing an amino group having active hydrogen can be produced. However, when the amount of the amine component used is too small, the resulting amideamine compound is slow in reacting with epoxy resin so that sufficient hardening cannot be attained and, in addition, the amount of the unreacted carboxyl groups becomes large whereby properties of the resulting hardened products deteriorate. On the other hand, when the amount of the amine component is too large, properties of the resulting epoxy resin hardened product, such as chemical resistance, are deteriorated or the amount of the unreacted polyamine component increases to cause toxicity such as skin trouble, which is unfavorable from the standpoint of working environment. Accordingly, the proportion of the polyamine (A) to the carboxylic acid (B) should be determined taking the above considerations. A preferred proportion is about 1.2 to about 4 mols, more preferably 1.5 to 2.5 mols, of the polyamine (A) per mol of the carboxylic acid (B).

The amideamine compounds of the present invention can be usually prepared by simultaneously charging the polyamine and the carboxylic acid into a reactor and heating the mixture, or heating the carboxylic acid to a predetermined temperature followed by dropwise addition of the polyamine thereto under stirring. The reaction conditions may be substantially the same as those employed for the production of conventional amideamine compounds. For example, the reaction can be carried out at a temperature ranging from about 100° to about 300° C., preferably 160° to 250° C., for a period of about 1 to about 20 hours, preferably 3 to 10 hours. During the reaction, it is desirable to reduce the reaction pressure to, for example, about 100 mmHg, or to introduce an inert gas such as a nitrogen gas into the reaction system in order to facilitate removal of water produced by the condensation reaction out of the reaction system.

Epoxy resins to be hardened using the amideamine compound of the present invention are known epoxy resins having at least two epoxy groups per molecule, and include glycidyl-type epoxy resins which are glycidyl compounds of polyhydric alcohols, polyhydric phenols, polycarboxylic acids or polyamines, and non-glycidyl-type epoxy resins.

The hardening agent of the present invention is incorporated into the expoy resin usually in a proportion based on the active hydrogen equivalent of the amideamine compound and the epoxy equivalent of the epoxy resin, but such a proportion is not particularly limitative because the desired properties of the hardened epoxy resin can sufficiently be obtained even if the equivalent ratio is slightly deviated. For example, the active hydrogen equivalent of the amideamine compound to the epoxy equivalent can be varied in the range of from about 1:4 to about 4:1. In hardening, it is also possible to incorporate various additives such as diluents such as xylene, cellosolve, ketones, etc., fillers such as talc, various metal powders, calcium carbonate, etc., various pigments and the like depending on the end purpose of the hardened product. These additives are well known in the art.

The amideamine compounds according to the present invention have good compatibility with epoxy resins. Further, in carrying out hardening of epoxy resins using the amideamine compounds of the invention, satisfactory epoxy resin hardened products can be obtained without aging so that the problem of reduction in working efficiency can be minimized. The hardened products thus obtained have various excellent properties such as excellent transparency, gloss and flexibility, high adhesiveness to afford high peeling strength, high impact resistance, and good chemical resistance.

The present invention will now be illustrated in greater detail by way of examples.

EXAMPLES 1 TO 6

In a reaction vessel equipped with a stirrer, thermometer, a tube for introducing nitrogen, a dropping funnel and a condenser were placed predetermined amounts of the polyamines and carboxylic acids having the compositions as shown in Table 1, and the reaction was conducted by heating at 160° to 250° C. in a nitrogen atmosphere while removing the condensed water by distillation, to obtain amideamine compounds. Each of the amideamine compounds thus obtained was diluted with a mixed solvent of xylene and ethylene glycol monoethyl ether (1:1 by weight) so as to have a predetermined solid concentration, and the amine value and viscosity of the product were determined. The results obtained are shown in Table 1.

TABLE 1

| Composition (part by weight) | | Example | | | | | |
|---|---|---|---|---|---|---|---|
| | | 1 | 2 | 3 | 4 | 5 | 6 |
| Polyamine (A) | Average Number of Repeating Unit (n) | | | | | | |
| reaction product between m-xylylenediamine and epichlorohydrin (polyamine compound) | 1.0 | 268 | 252 | — | — | 268 | — |
| | 1.2 | — | — | 183 | — | — | — |
| | 1.5 | — | — | — | 339 | — | — |
| | 2.0 | — | — | — | — | — | 468 |
| m-xylylenediamine | | — | — | 68 | — | — | 14 |
| triethylenetetramine | | — | — | — | — | 58 | — |
| Carboxylic Acid (B) | | | | | | | |
| VERSADYME 216[1] | | 231 | 289 | 289 | 116 | — | 231 |
| ETHOL FA-XC[2] | | — | — | — | 117 | — | 58 |
| adipic acid | | — | — | — | — | 87 | — |
| Analysis Results | | | | | | | |
| Solid Content (wt %) | | 60 | 50 | 60 | 60 | 60 | 60 |
| Amine Value (mg KOH/g) | | 160 | 125 | 130 | 182 | 306 | 200 |
| Viscosity (at 25° C.) (cps) | | 32 | 68 | 5 | 10 | 90 | 100 |

[1] A trade name for a dimer acid sold by Japan Henkel Co.
[2] A trade name for a tall oil fatty acid sold by Arakawa Kagaku Kogyo KK.

Physical properties and chemical resistance of the epoxy resin hardened products which were hardened with the amideamine compounds of the present invention were determined as follows: Each of the amideamine compounds obtained in Examples 1 to 6 which had been adjusted to have the prescribed solid content was incorporated to an expoxy resin, "Epokote #1001-X-75" (a trade name manufactured by Yuka Shell Epoxy KK) in the amount as indicated in Table 2. The resulting mixture was coated on a cold-rolled steel plate to a film thickness of 200μ and hardened at 20° C. over a period of 7 days. The physical properties and the chemical resistance of the hardened products are shown in Table 2 and Table 3, respectively.

TABLE 2

| | Example | | | | | |
|---|---|---|---|---|---|---|
| | 1 | 2 | 3 | 4 | 5 | 6 |
| Amount of Hardening Agent Based on Epoxy Resin (PHR) | 42 | 57 | 55 | 38 | 21 | 36 |
| Pencil Hardness Test (JIS K-5400) | H | H | F | F | H | F |
| Cross-cut Adhesion Test | 100/100 | 100/100 | 95/100 | 100/100 | 90/100 | 100/100 |
| Erichsen Test (mm) | >10 | >10 | >10 | >10 | >10 | >10 |
| Impact Test (½" × 500 g) (cm) | | | | | | |
| Direct | >50 | >50 | >50 | >50 | >50 | >50 |
| Reverse | >50 | >50 | >50 | >50 | >50 | >50 |

In Erichsen test, all of the hardened products withstood an indentation depth of 10 mm or more, but cracks generated in the steel plate with an indentation depth more than 10 mm.

TABLE 3

| | Example | | | | | |
|---|---|---|---|---|---|---|
| | 1 | 2 | 3 | 4 | 5 | 6 |
| Amount of Hardening Agent Based on Epoxy Resin (PHR) | 42 | 57 | 45 | 38 | 21 | 36 |
| Appearance Before Chemical Resistance Test | good | good | good | good | good | good |
| Appearance After Treating With: | | | | | | |
| 10% sodium[(1),(2)] hydroxide | good | good | good | good | good | good |
| 5% sulfuric[(1),(2)] acid | " | " | " | " | " | " |
| 5% phosphoric[(1),(2)] acid | " | " | " | " | " | " |
| 2% formic[(1),(2)] acid | " | " | " | " | " | " |
| 5% lactic[(1),(2)] acid | " | " | " | " | " | " |
| 5% citric[(1),(2)] acid | " | " | " | " | " | " |
| 5% acetic[(1),(2)] acid | " | " | " | " | slight swelling | " |
| 5% acetic acid/[(1),(2)] 10% ethanol | " | " | " | " | slight swelling | " |
| methanol[(2)] | " | " | " | " | good | " |
| ethanol[(2)] | " | " | " | " | " | " |
| gasoline[(2)] | " | " | " | " | " | " |
| 15% methanol/[(2)] 85% gasoline | " | " | " | " | slight swelling | " |
| 15% ethanol[(2)] | " | " | " | " | slight 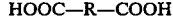 | " |
| 85% gasoline toluene[(2)] | " | " | " | " | swelling good | " |
| boiling water[(3)] | " | " | " | " | " | " |
| Humidity Resistance[(4)] | " | " | " | " | " | " |
| Spraying of Sodium[(5)] Chloride Solution | " | " | " | " | " | " |

Note:
[(1)]Aqueous solution
[(2)]Immersed at room temperature for 7 days
[(3)]Immersed for 6 hours
[(4)]At 49° C. and 98% relative humidity for 14 days
[(5)]With 5% aqueous sodium chloride solution for 14 days While the invention has been described in detail and with reference to specific embodiments thereof, it will be apparent to one skilled in the art that various changes and modifications can be made therein without departing from the spirit and scope thereof.

What is claimed is:

1. A hardening agent for epoxy resins comprising an amideamine compound which is a reaction produce between (A) a polyamine mainly comprising a compound represented by the formula:

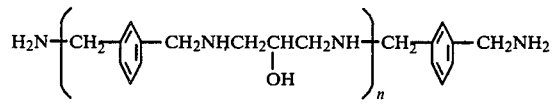

wherein n is the number of repeating units and represents an integer of 1 or 2, which is obtained by reacting m-xylylenediamine and epichlorohydrin, and (B) a carboxylic acid selected from the group consisting of polycarboxylic acids, dicarboxylic acids and monocarboxylic acids.

2. A hardening agent of claim 1, wherein the polyamine (A) is used in combination with an amine selected from the group consisting of aliphatic polyamines, aromatic diamines, aliphatic amines having an aromatic ring and alicyclic amines.

3. A hardening agent of claim 1, wherein the polycarboxylic acids are polymerized fatty acids.

4. A hardening agent of claim 1, wherein the dicarboxylic acids are represented by the formula

HOOC—R—COOH wherein R is a divalent aliphatic radical represented by $-CH_2)_m$ wherein m is zero or an integer of 1 to 18, or a phenylene radical.

* * * * *